United States Patent
Tsuji et al.

(10) Patent No.: US 7,129,816 B2
(45) Date of Patent: Oct. 31, 2006

(54) REMOTE CONTROL SYSTEM

(75) Inventors: Hiroyuki Tsuji, Anjo (JP); Ryozo Okumura, Kariya (JP)

(73) Assignee: Denso Corporation, Kariya (JP)

( * ) Notice: Subject to any disclaimer, the term of this patent is extended or adjusted under 35 U.S.C. 154(b) by 162 days.

(21) Appl. No.: 10/657,091

(22) Filed: Sep. 9, 2003

(65) Prior Publication Data

US 2004/0056776 A1    Mar. 25, 2004

(30) Foreign Application Priority Data

Sep. 17, 2002  (JP) ............................ 2002-270543

(51) Int. Cl.
*H04Q 9/00* (2006.01)
*G08C 19/00* (2006.01)
*H01H 47/22* (2006.01)

(52) U.S. Cl. .............................. 340/5.26; 340/825.72; 340/825.74; 340/825.69; 307/10.2; 307/10.4

(58) Field of Classification Search ............... 340/5.26, 340/825.72, 825.74, 825.69; 307/10.2, 10.4
See application file for complete search history.

(56) References Cited

U.S. PATENT DOCUMENTS

| | | | |
|---|---|---|---|
| 5,596,317 A | * | 1/1997 | Brinkmeyer et al. ....... 340/5.26 |
| 5,767,784 A | * | 6/1998 | Khamharn .................. 340/5.23 |
| 5,774,065 A | * | 6/1998 | Mabuchi et al. ........ 340/825.72 |
| 5,905,445 A | * | 5/1999 | Gurney et al. ............. 340/5.72 |
| 6,067,028 A | | 5/2000 | Takamatsu |
| 6,181,252 B1 | | 1/2001 | Nakano |

FOREIGN PATENT DOCUMENTS

JP      10-61277      3/1998

* cited by examiner

*Primary Examiner*—Jeffery Hofsass
*Assistant Examiner*—Scott Au
(74) *Attorney, Agent, or Firm*—Posz Law Group, PLC

(57) ABSTRACT

Provided is a remote control system capable of preventing a key code from being deciphered when the key code is transmitted from a transmitter to a receiver to be registered. In the transmitter, in response to a specified switch operation, a k-th common key code in a table to be used for enciphering a key code is changed to a registration key code stored in advance so that a key code is enciphered through the use of the table including the registration key code. A transmission code is produced by adding a predetermined code to the enciphered key code and the transmission code signal is transmitted to the receiver. This prevents easy deciphering of the key code because the key code is transmitted in a state enciphered.

12 Claims, 13 Drawing Sheets

ENCIPHERING TABLE

| NO. | COMMON KEY CODE (m BITS) |
|---|---|
| 1 | KEY (1) |
| 2 | KEY (2) |
| ⋮ | ⋮ |
| k | KEY (k) |
| ⋮ | ⋮ |
| n | KEY (n) |

KEY CODE SPECIFIC TO VEHICLE

ENCIPHERING TABLE

| NO. | COMMON KEY CODE (m BITS) |
|---|---|
| 1 | KEY (1) |
| 2 | KEY (2) |
| ⋮ | ⋮ |
| k | KEY (k) |
| ⋮ | ⋮ |
| n | KEY (n) |

KEY CODE SPECIFIC TO VEHICLE (PORTABLE UNIT SIDE)

REMOTE CONTROL SYSTEM

BACKGROUND OF THE INVENTION

1) Field of the Invention

The present invention relates to a remote control system for use as a wireless door locking control system for a vehicle, or the like.

2) Description of the Related Art

So far, from the viewpoint of the injustice prevention such as eavesdropping, a remote control system applicable to wireless door locking control for a vehicle or the like has been designed to encipher a transmission code to be transmitted from a transmitter to prevent a user from deciphering it. For example, the remote control system disclosed in Japanese Paten laid-Open No. HEI 10-61277 is made to encipher a rolling code altered in a predetermined sequence every transmission from a transmitter with a key code peculiar to each system for producing an enciphered rolling code and further to encipher the ciphered rolling code with an ID code, while a receiver, when receiving these codes, restores the rolling code and ID code to issue an instruction signal to a controlled object when the restored ID code agrees with an ID code stored and the restored rolling code and a rolling code stored satisfies a predetermined relationship.

Thus, this conventional remote control system is designed to encipher a rolling code through the use of a key code stored in common to a transmitter and a receiver without transmitting a rolling code for mere collation.

The aforesaid key code to be used for the enciphering of a rolling code is transmitted from the transmitter to the receiver and is stored in a non-volatile storage medium of the receiver. However, in this remote control system, there is a possibility that the key code is eavesdropped in the transmission of the key code from the transmitter to the receiver, for that the key code is transmitted from the transmitter in a non-enciphered condition. Accordingly, since the rolling code to be enciphered with the key code is altered in a sequence set in advance, for example, if a person (designer) who established this sequence acquires the key code, then the person can break the enciphered rolling code and ID code.

SUMMARY OF THE INVENTION

The present invention has been developed with a view to eliminating this problem, and it is therefore an object of the invention to provide a remote control system capable of preventing the acquisition of a key code in registering the key code in a receiver.

For this purpose, in accordance with an aspect of the present invention, there is provided a remote control system comprising a transmitter including enciphering means for enciphering a predetermined code through the use of a specific key code peculiar to each system, the transmitter transmitting the enciphered code produced by the enciphering means, and a receiver including deciphering means for receiving the enciphered code to decipher (decode, restore) the enciphered code through the use of the specific key code, the receiver outputting an instruction for activating a controlled object when the deciphered code from the deciphering means satisfies a predetermined relationship wherein, in a case in which the specific key code to be used in the deciphering means is transmitted from the transmitter to the receiver and registered therein, the enciphering means enciphers the specific key code through the use of a predetermined common key code stored in the transmitter and the receiver and the transmitter transmits the enciphered specific key code to the receiver.

Thus, in the remote control system according to the present invention, for example, for use as a wireless door locking control system for a vehicle, the specific key code of the transmitter is enciphered and then transmitted to the receiver. Accordingly, even if the specific key code of the transmitter is eavesdropped when the specific key code is transmitted to the receiver and registered therein, the enciphering of the specific key code makes it difficult to acquire the specific key code, which can prevent an unauthorized copying of the transmitter.

In addition, since the enciphering of the specific key code is made by the enciphering means which enciphers a predetermined code for activating the controlled object, there is no need to prepare a dedicated enciphering algorithm, which leads to saving the software capacity and reducing the management manhour.

Moreover, in the remote control system, the transmitter is made to transmit the enciphered specific key code to the receiver in response to a predetermined operation. For example, a push button pressing way, a push button pressing sequence or the like, a user does not conduct usually, is registered at the registration of the specific key code. In this case, the transmission of the specific key code to the receiver is made by conducting this registered operation.

Furthermore, in accordance with a further aspect of the present invention, there is provided a remote control system comprising a portable unit including enciphering means for enciphering a predetermined code through the use of a specific key code peculiar to each system, the portable unit transmitting the enciphered code produced by the enciphering means, and a vehicle-mounted control unit including deciphering (restoring) means for transmitting the predetermined code to the portable unit and receiving the enciphered code returned in response to the transmission of the predetermined code to decipher the enciphered code through the use of the specific key code, the vehicle-mounted control unit outputting an instruction for activating a controlled object when the deciphered code produced by the deciphering means satisfies a predetermined relationship with respect to the transmitted predetermined code, wherein, in a case in which the specific key code to be used in the deciphering means is transmitted from the portable unit to the vehicle-mounted control unit and registered therein, the enciphering means enciphers the specific key code through the use of a predetermined common key code stored in the portable unit and the vehicle-mounted control unit and the portable unit transmits the enciphered specific key code to the vehicle-mounted control unit.

Thus, when the remote control system according to the present invention is placed for use in an electronic key system for controlling each door locking mechanism or steering locking mechanism of a vehicle or for controlling the vehicle engine into a start allowing/inhibiting condition, the specific key code is placed into an acquisition difficulty condition, which can prevent the unauthorized copying of the portable unit.

In addition, in this remote control system, the portable unit is made to transmit the enciphered specific key code to the vehicle-mounted control unit in response to a predetermined operation. For example, a push button pressing way, a push button pressing sequence or the like, a user does not take usually, is registered at the registration of the specific key code. Thus, the transmission of the specific key code to the vehicle-mounted control unit is made by conducting this registered operation.

BRIEF DESCRIPTION OF THE DRAWINGS

Other objects and features of the present invention will become more readily apparent from the following detailed description of the preferred embodiments taken in conjunction with the accompanying drawings in which.

DESCRIPTION OF THE PREFERRED EMBODIMENTS

Embodiments of the present invention will be described hereinbelow with reference to the drawings.

(First Embodiment)

In this embodiment, a description will be given hereinbelow of an example in which a remote control system according to the present invention is applied to an apparatus for conducting wireless door locking control in a vehicle.

Figure 1:
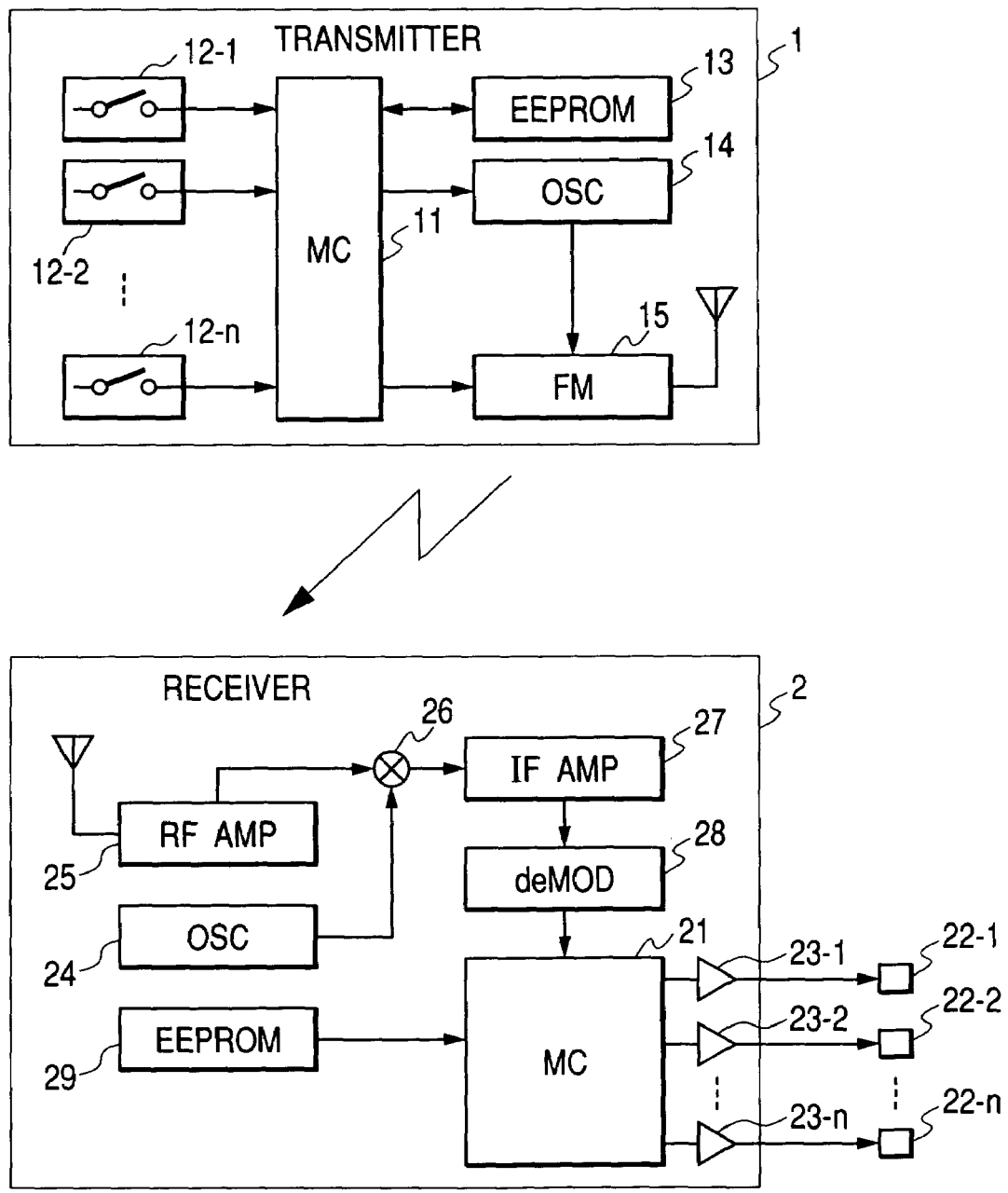
FIG. 1 is a block diagram showing a configuration of each of a transmitter and a receiver according to a first embodiment of the present invention.

FIG. 1 is a block diagram showing a configuration of each of a transmitter and a receiver according to this embodiment.

In FIG. 1, a transmitter 1 is equipped with switches 12-1, 12-2, . . . , 12-n for remotely carrying out different functions (for example, in a vehicle, locking/unlocking of each door, opening/closure of a trunk, setting of a seat position, and others), with the signals generated by the switch operation being inputted to a microprocessor (MC) 11.

This microprocessor 11 is connected to an EEPROM 13 in which stored are an ID code peculiar to the transmitter 1, a rolling code varying in a predetermined sequence (order) whenever the transmitter 1 carries out the transmission, a key code peculiar to a vehicle and registration key code (default key code). These ID code, rolling code, key code and registration key code are stored in the EEPROM 13 in a vehicle manufacturing process.

In addition, the EEPROM 13 stores an enciphering table (see FIG. 2) to be used when the microprocessor 11 enciphers the rolling code and stores an enciphering algorithm in the form of a program. The enciphering processing is conducted in the microprocessor 11 according to the program stored therein.

Figures 2, 3:
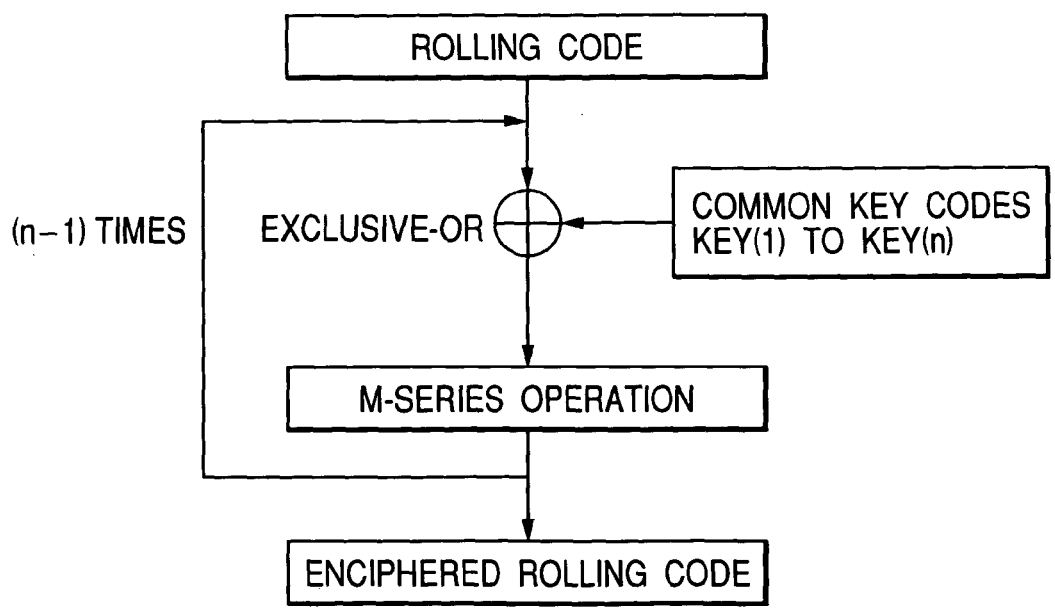
FIG. 2 is an illustration of an enciphering table to be used for enciphering a rolling code in the first embodiment.
FIG. 3 is an illustration of an enciphering algorithm according to the first embodiment.

In the table, n common key codes [KEY(1) to KEY(n)] each comprising a different group of m bits are set as shown in FIG. 2. Of these, a key code peculiar to a vehicle and stored in the EEPROM 13 is set as the k-th common key code.

Furthermore, the microprocessor 11 is connected to an oscillator circuit (OSC) 14 and an frequency modulator circuit (FM) 15, and a transmission code finally produced in the microprocessor 11 is frequency-modulated and then transmitted in the form of a minute electric wave.

A receiver 2 is equipped with a receiving circuit to demodulate the minute electric wave transmitted from the transmitter 1. This receiving circuit is made up of a local oscillator (OSC) 24, a radio-frequency amplifier (RF AMP) 25, a mixer circuit 26, an intermediate-frequency amplifier (IF AMP) 27, and a demodulator circuit (deMOD) 28. An output signal demodulated is inputted a microprocessor (MC) 21. The microprocessor 21 deciphers or restores the enciphered rolling code on the basis of the demodulated output signal in accordance with predetermined processing.

The microprocessor 21 is connected to an EEPROM 29 in which stored are an ID code peculiar to the receiver 2, a rolling code included in the previous transmission code received from the transmitter 1, a key code peculiar to a vehicle and registration key code (default key code). These ID code, vehicle-peculiar key code and registration key code have the same contents as those of the ID code, vehicle-peculiar key code and registration key code stored in the transmitter 1, respectively.

In addition, the EEPROM 29 stores a deciphering table (see FIG. 2) to be used when the microprocessor 21 deciphers (restores) the enciphered rolling code and stores, in the form of a program, a deciphering algorithm for restoring the enciphered rolling code from the output signal.

Still additionally, the microprocessor 21 is connected through drive circuits 23-1, 23-2, . . . , 23-n to controlled objects 22-1, 22-2, . . . , 22-n (for example, an actuator for performing the locking/unlocking of each door of a vehicle, the opening/closure of a trunk of the vehicle, the setting of a seat position of the vehicle or the like), with the controlled objects 22-1, 22-2, . . . , 22-n being made to operate in accordance with a signal from the microprocessor 21.

(Normal Operation)

Secondly, referring to flow charts of FIGS. 4 and 5, a description will be given hereinbelow of an operation to be implemented when remote control on a controlled object is conducted through the use of the above-mentioned transmitter 1 and receiver 2.

Figure 4:
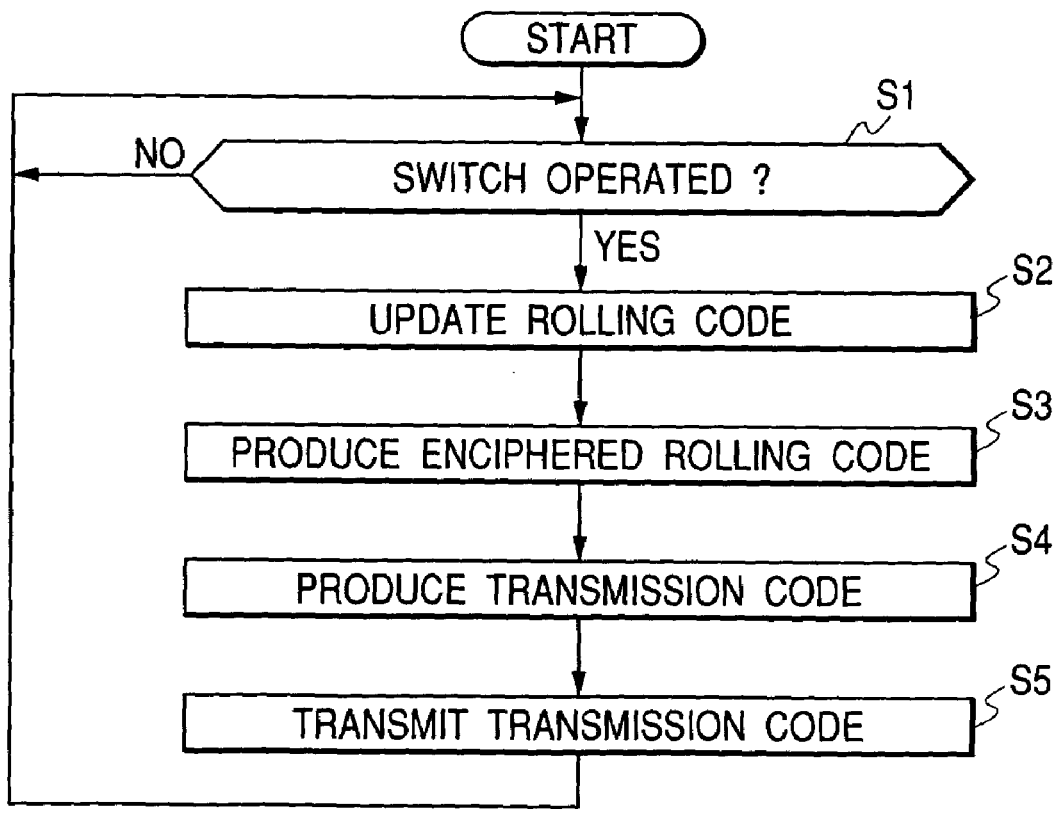
FIG. 4 is a flow chart showing processing to be implemented in a transmitter for remotely controlling a controlled object in the first embodiment.
Figure 5:
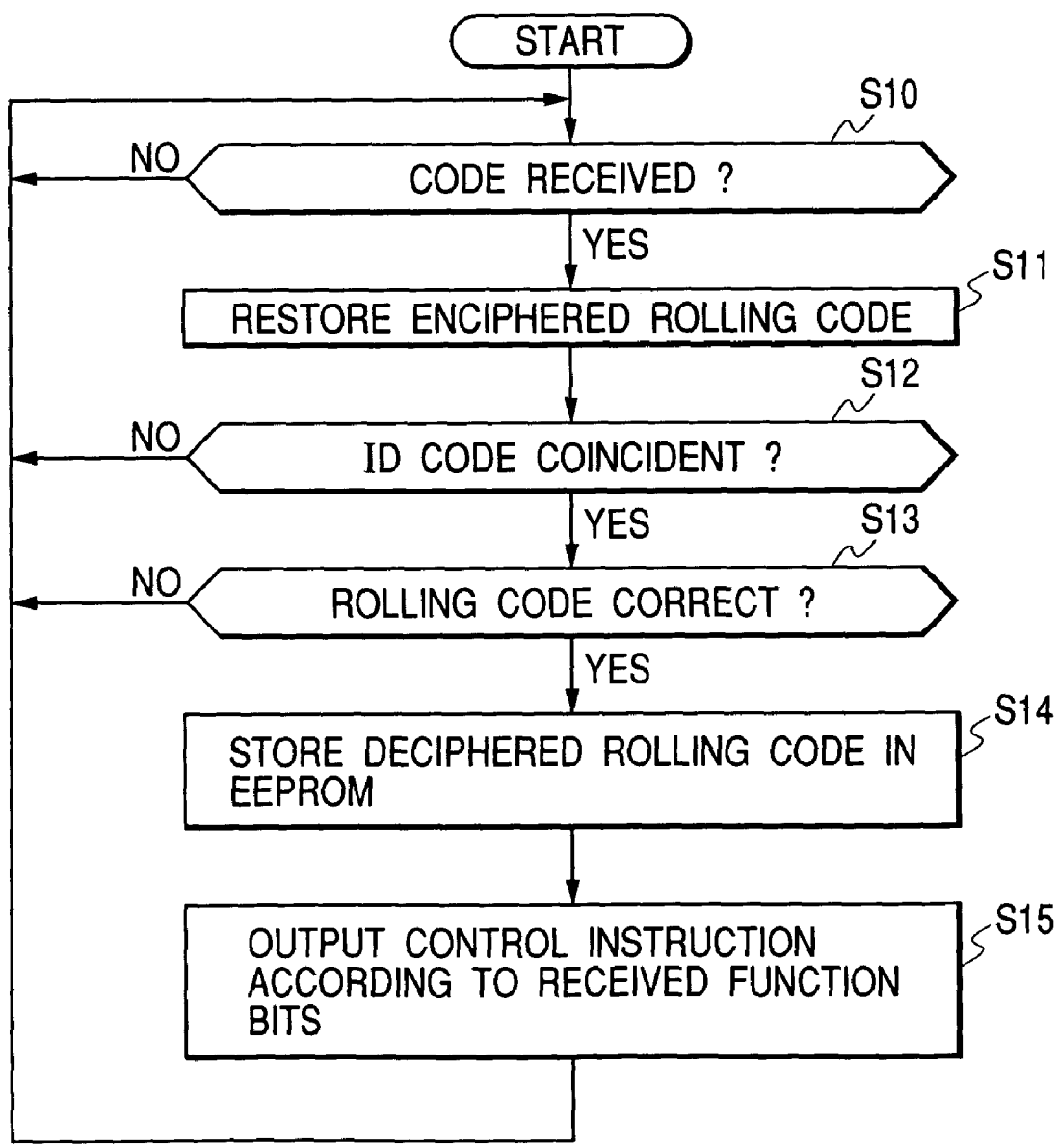
FIG. 5 is a flow chart showing processing to be implemented in a receiver for remotely controlling a controlled object in the first embodiment.

In FIG. 4, in a step S1, a decision is made as to whether any one of the switches 12-1, 12-2, ..., 12-n is operated or not. In the case of the operation of one switch, the operational flow advances to a step S2. In the case of no operation thereof, the control falls into a waiting condition until the operation thereof.

The step S2 is for updating a rolling code stored in the EEPROM 13. This rolling code is a variable comprising m bits and is altered according to a predetermined rule (for example, shift operations, or the like) whenever the transmitter 1 carries out the transmission.

A step S3 is for enciphering the rolling code to produce an enciphered rolling code. Referring to the table shown in FIG. 2 and the enciphering algorithm shown in FIG. 3, a description will be given hereinbelow of a method of producing the enciphered rolling code.

First, in FIG. 3, an exclusive-OR logic operation is made between the first common key code [KEY(1)] shown in FIG. 2 and a rolling code. Subsequently, a well-known M-series operation is conducted with respect to the exclusive-OR logic operation result. Thereafter, the exclusive-OR logic operation using the second and subsequent key codes and the M-series operation are repeatedly conducted (n−1) times, thereby enciphering the rolling code and finally producing an enciphered rolling code.

In this connection, in the k-th exclusive-OR logic operation, the key code specific to the vehicle is used as the k-th common key code [KEY(k)]. Therefore, the k-th exclusive-OR logic operation varies according to vehicle and the enciphering method becomes different according to vehicle.

In a step S4, a transmission code is produced through the use of the enciphered rolling code produced in the step S3, an ID code stored in the EEPROM 13 and function codes. For this transmission code, a transmission code is constructed by adding format bits (start bit, stop bit, parity bit) to each of these codes and further adding a random number comprising a predetermined number of bits thereto.

The function codes are codes for operating the controlled objects 22-1, 222, ..., 22-n, and correspond to the switches 12-1, 12-2, ..., 12-n, which remotely activate the functions (for example, the locking/unlocking of each door, the opening/closure of a trunk, the setting of a seat position, and others), operated in the step S1.

In a step S5, the transmission code produced in the step S4 is outputted through the frequency modulator circuit 15. Therefore, the transmission code is frequency-modulated and transmitted to the exterior of the transmitter 1 as a minute electric wave.

Furthermore, referring to a flow chart of FIG. 5, a description will be given hereinbelow of an operation to be implemented from when the receiver 2 receives the above-mentioned transmission code until it issues a control instruction to the controlled objects.

First, in a step S10, a decision is made as to whether or not to receive the transmission code from the transmitter 1. In the case of the reception of the transmission code, the operational flow advances to a step S11. On the other hand, in the case of no reception thereof, the operational flow falls into a stand-by condition until the reception thereof.

In the step S11, the enciphered rolling code, the ID code and the function codes are extracted from the transmission code and the extracted enciphered rolling code is restored to its original state. In this case, a deciphering (restoring) algorithm is used for the restoration of the enciphered rolling code.

In a step S12, a decision is made as to whether or not the extracted ID code agrees (coincides) with the ID code stored in the EEPROM 29. In the case of the agreement between the ID codes, the operational flow proceeds to a step S13. Otherwise, the operational flow returns to the step S10 so that the operation waits for the transmission code.

In the step S13, a comparison is made between the rolling code restored in the step S11 and the rolling code stored in the EEPROM 29 to make a decision as to whether or not the restored rolling code is in a predetermined range with respect to the stored rolling code. If it is in the predetermined range, the operational flow proceeds to a step S14. If not, the operational flow returns to the step S10 so that the operation again waits for the transmission code.

Incidentally, the step S13 is made in consideration of a case in which the transmission code transmitted from the transmitter 1 cannot always be received by the receiver 2. That is, there is a case in which, even if the transmission code is transmitted from the transmitter 1, the receiver 2 cannot receive the transmission code (so-called useless transmission from the transmitter 1) by reason of electric wave interference or the like. At this time, only the rolling code of the transmitter 1 is updated. For this reason, the allowable range is set in order to cope with the useless transmission therefrom.

Thus, in this embodiment, a decision is made as to whether or not the restored rolling code satisfies a predetermined relationship.

In the step S14, the rolling code stored in the EEPROM 29 of the receiver 2 is once erased and the rolling code restored from the transmission code is stored as a new rolling code. Thereafter, in the processing of the step S13, a comparison is made between the newly stored rolling code and the restored rolling code. Moreover, in a step S15, referring to the function codes set in the transmission code, the controlled objects 22-1, 22-2, ..., 22-n are operated through the drive circuits 23-1, 23-2, ..., 23-n.

(Key Code Registration)

Figure 8:
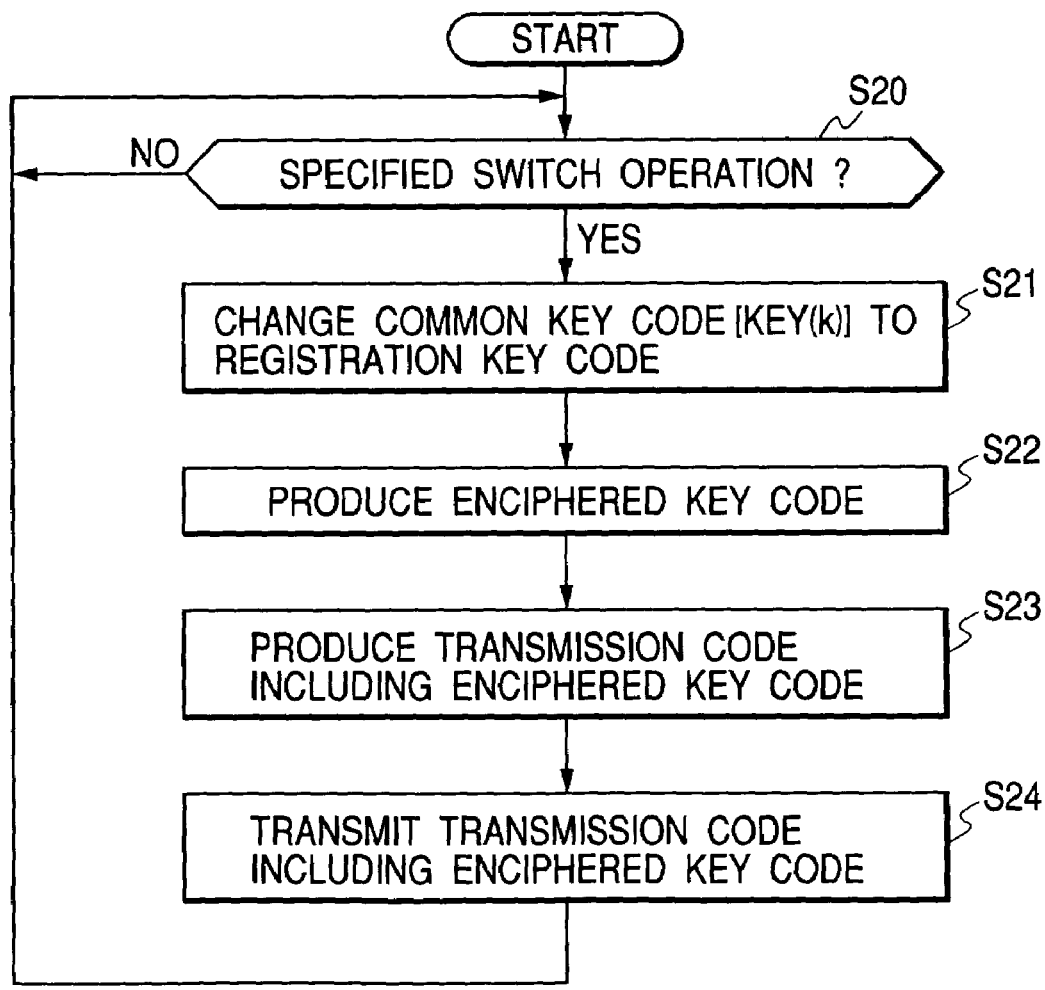
FIG. 8 is a flow chart showing processing to be implemented in a transmitter for transmitting a key code in the first embodiment.
Figure 9:
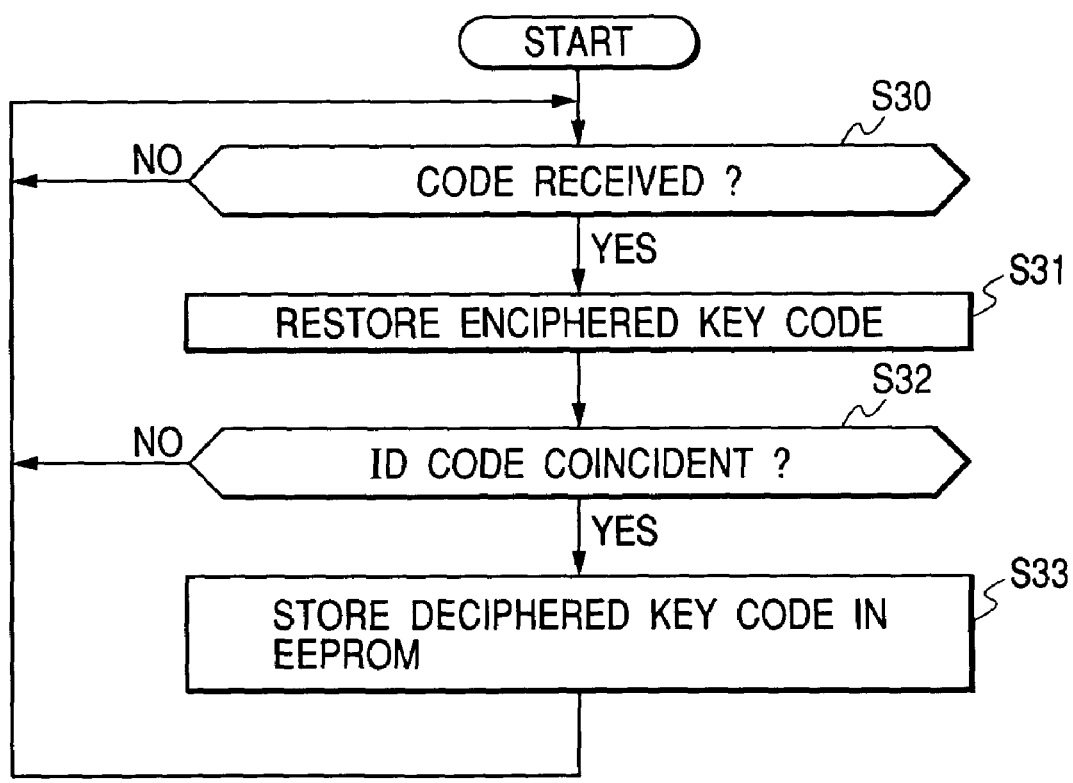
FIG. 9 is a flow chart showing processing to be implemented in a receiver for registering a key code in the first embodiment.

Furthermore, referring to flow charts of FIGS. 8 and 9, a description will be given hereinbelow of operations of the transmitter 1 and the receiver 2 to be conducted when a specific key code peculiar to a vehicle is transmitted from the transmitter 1 to the receiver 2 to be registered, which organizes a feature of this embodiment. In this case, prior to transmitting the key code to be registered from the transmitter 1, the receiver 2 is previously switched to a key code registration mode. For example, this mode switching processing is made in a manner such that a mode switching signal is transmitted from a registration-dedicated transmitter, separately prepared, to the receiver 2.

When the receiver 2 is switched to the key code registration mode, the k-th common key code [KEY(k)] in a deciphering table (which is the same as the table shown in FIG. 2) to be used for deciphering the key code is changed to a registration key code stored in the EEPROM 29. This registration key code is a variable comprising m bits, for example, 0000 or ffff.

First, in a step S20, a decision is made as to whether or not the switches 12-1, 12-2, ..., 12-n are subjected to a specified operation. If the specified operation is conducted, the operational flow advances to a step S21. On the other hand, if not, the operation falls into a waiting condition until the switch operation. In the case of the specified operation being done, the transmitter 1 enciphers the key code and transmits it to the receiver 2. Therefore, the key code of in the transmitter 1 to be registered can easily be transmitted to the receiver 2.

This specified operation is different from a usual switch pressing manner when a user operates the controlled object remotely, and for example, is simultaneously pressing the plurality of specified switches 12-1, 12-2, . . . , 12-n or pressing the plurality of specified switches 12-1, 12-2, . . . , 12-n in a specified order. However, in the present invention, the operation to be conducted for enciphering and transmitting the key code is not limited to these operations.

Figure 6:
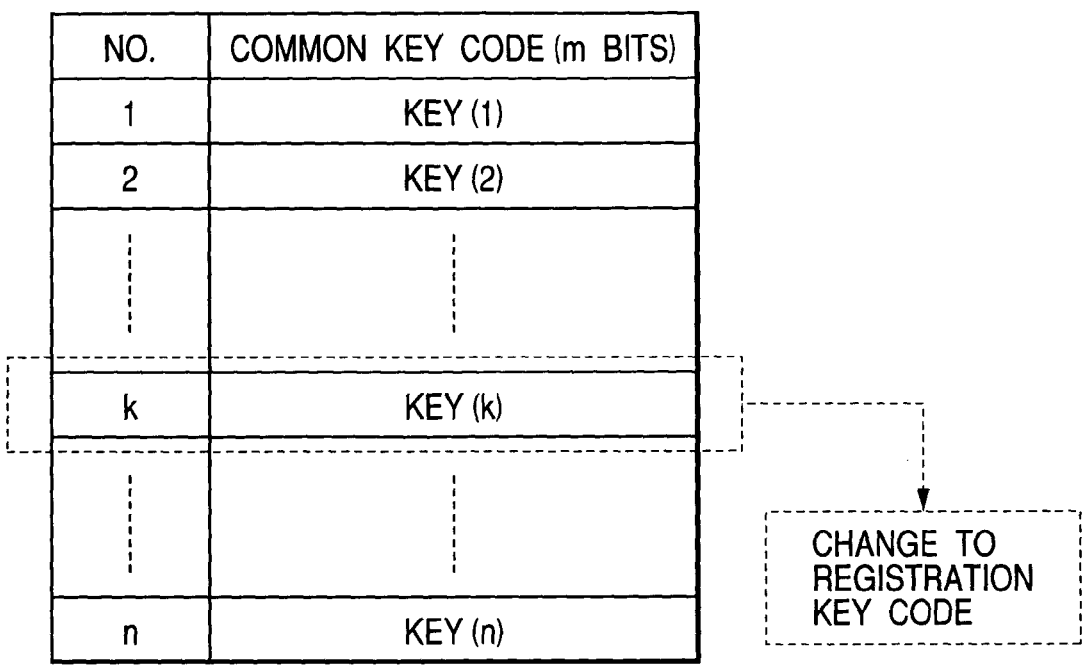
FIG. 6 is an illustration of an enciphering table to be used for enciphering key code at the key code registration in the first embodiment.
Figure 7:
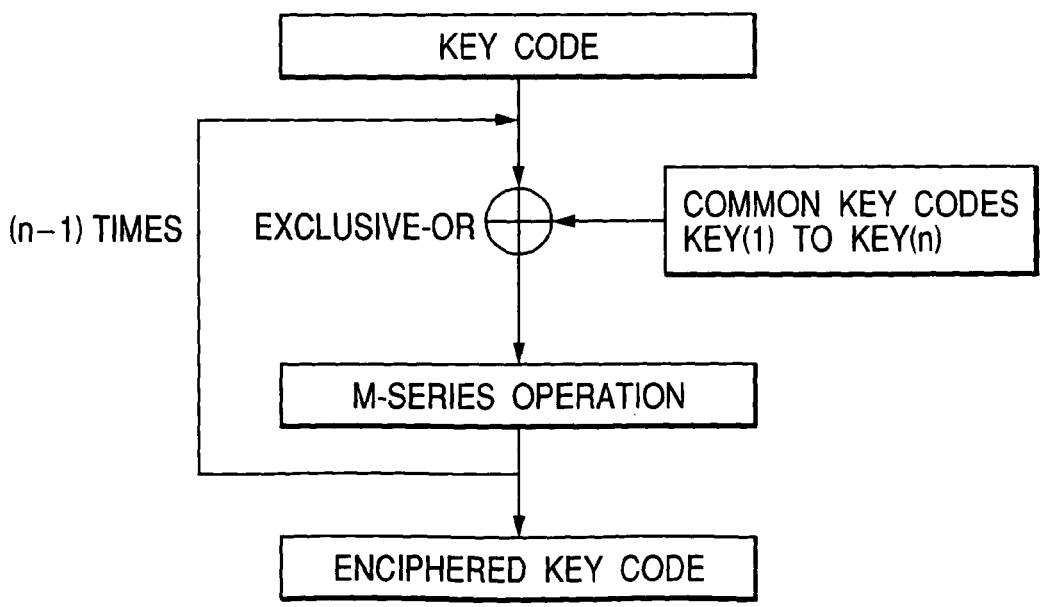
FIG. 7 is an illustration of an enciphering algorithm for key code enciphering in the first embodiment.

In the step S21, in the table stored in the EEPROM 13, the k-th common key code [KEY(k)] is changed to a registration key code to be stored in the same EEPROM 13 as shown in FIG. 6. As mentioned above, this registration key code is a variable comprising m bits, for example, 0000 or ffff.

In a step S22, the key code peculiar to the vehicle and stored in the EEPROM 13 is extracted and enciphered to produce an enciphered key code. This enciphered key code producing method is the same as the above-mentioned method of enciphering a rolling code for the production of the enciphered rolling code, except that the registration key code is used as the k-th common key code in the table shown in FIG. 6 and the object to be enciphered through the use of the enciphering algorithm is only the key code specific to the vehicle. Therefore, the description of the enciphered key code producing method will be omitted for brevity.

As mentioned above, the key code enciphering in this embodiment employs an enciphering algorithm which is for enciphering the rolling code at the remote operation on the controlled object and, hence, there is no need to prepare a dedicated enciphering algorithm, which leads to saving the software capacity and reducing the management manhour.

In a step S23, a transmission code is produced using the enciphered key code produced in the step S22 and the ID code stored in the EEPROM 13. As mentioned above, this transmission code is produced by adding format bits (start bit, stop bit, parity bit) to each of the codes and further adding a random number comprising a predetermined number of bits thereto.

Following this, in a step S24, the transmission code produced in the step S23 is outputted through the frequency modulator circuit 15. therefore, the transmission code including the enciphered key code is frequency-modulated and transmitted to the exterior of the transmitter 1 in the form of a minute electric wave.

Furthermore, referring to the flow chart of FIG. 9, a description will be given hereinbelow of an operation to be conducted until the receiver 2 receives the aforesaid transmission code including the enciphered key code and the key code is restored and stored.

First, in a step S30, a decision is made as to whether or not the reception of the transmission code from the transmitter 1 takes place. In the case of the reception of the transmission code, the operational flow advances to a step S31. On the other hand, in the case of no reception thereof, the operation falls into a waiting condition until the reception thereof.

In the step S31, the ID code and the enciphered key code are extracted from the transmission code and the extracted enciphered key code is restored. The restoration of the enciphered key code is made through the use of a table setting a registration key code. In a step S32, a decision is made as to whether or not the extracted ID code agrees with the ID code stored in the EEPROM 29. In the case of the agreement between the ID codes, the operational flow advances to a step S33. In the case of no agreement therebetween, the operational flow returns to the step S30 so that the operation again falls into a transmission code waiting condition.

In the step S33, the key code restored from the transmission code is stored in the EEPROM 29 of the receiver 2. Alternatively, in a case in which the key code is already stored in the EEPROM 29, the key code already stored is once erased and the restored key code is stored therein.

As described above, the remote control system according to this embodiment is made to encipher the key code of the transmitter 1 and then transmit it to the receiver 2. Accordingly, even if the enciphered key code is eavesdropped when the key code is transmitted from the transmitter 1 to the receiver 2 and registered, the remote control system provides further difficult in acquiring the specific key code, which can prevent an unauthorized reproduction of the transmitter 1.

Incidentally, in this present invention, the enciphering algorithm and the deciphering algorithm are not limited to the above-mentioned enciphering method based on the exclusive-OR logic operation and M-series operation.

In addition, it is also appropriate to, in the normal operation and the key code registration processing, encipher an ID code included in the transmission code transmitted form the transmitter 1. Still additionally, it is also appropriate that a transmission code including an enciphered ID code is transmitted so that the receiver 2 receives the transmission code to carry out the restoration of the enciphered ID code.

(Second Embodiment)

As a second embodiment, a description will be given hereinbelow of an example in which the remote control system according to the present invention is applied to an electronic key system. In the electronic key system according to this embodiment, a security ECU mounted in a vehicle is made to control a locking mechanism of each door and a steering mechanism on the basis of a result of collation in predetermined code between the interior and exterior of the vehicle through the use of two-way communications between a portable unit (electronic key) side and a vehicle side, and further to control the engine starting allowing/inhibiting condition of the vehicle.

Figures 10, 11:
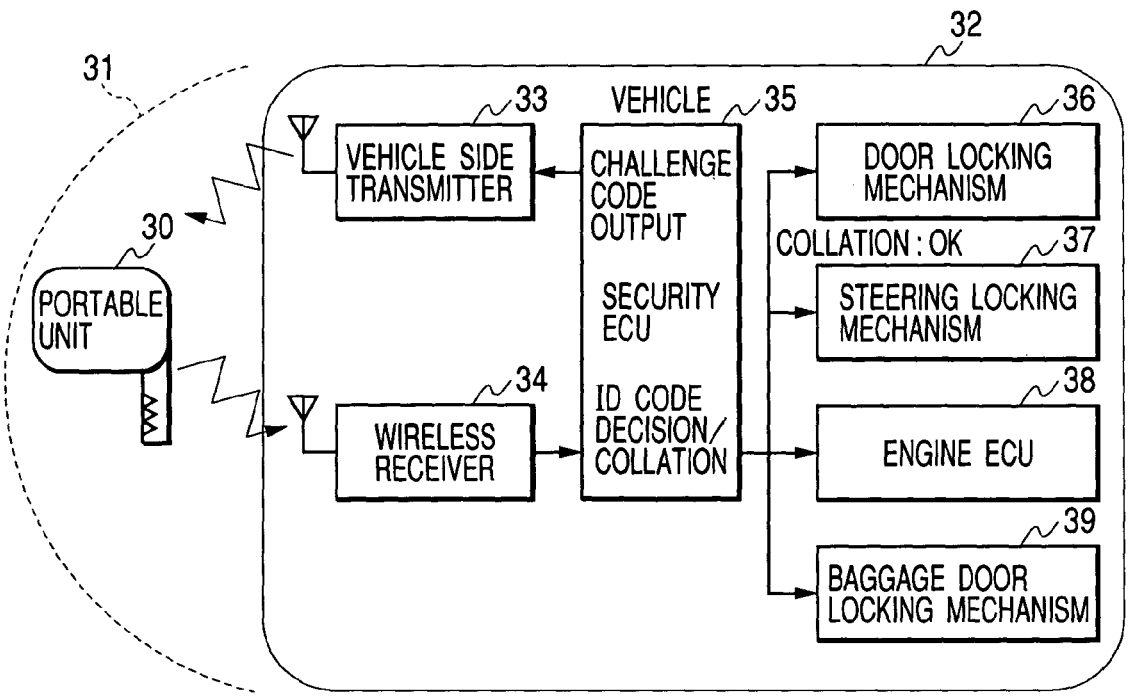
FIG. 10 is an illustration of the entire configuration of an electronic key system according to a second embodiment of the present invention.
FIG. 11 is an illustration of an enciphering table to be used for enciphering a challenge code in the second embodiment.

FIG. 10 is an illustration of the entire configuration of an electronic key system according to this embodiment. As shown in this illustration, a vehicle 32 is equipped with a vehicle side transmitter 33 which transmits a challenge code signal at a predetermined interval on the basis of an instruction from the security ECU 35. This vehicle side transmitter 33 is placed at each of a plurality of places in the vehicle 32, and the range (distance) of the challenge code signal from each of the transmitters 33 is set so that a detection area 31 corresponding to the challenge code signal range is established around the vehicle 32. This enables the immediate detection of the fact that a wearer of the portable unit 30 approaches the vehicle 32.

The portable unit 30 is equipped with a transmitting/receiving circuit (not shown) for receiving a challenge code signal from the vehicle transmitter 33 or for transmitting a transmission code signal including enciphered challenge code and ID code. Moreover, the portable unit 30 includes a microprocessor (not shown) for enciphering the received challenge code signal and a RAM (not shown) for storing an ID code peculiar to the portable unit 30, a key code peculiar to the vehicle and a registration key code (default key code).

Figure 12:
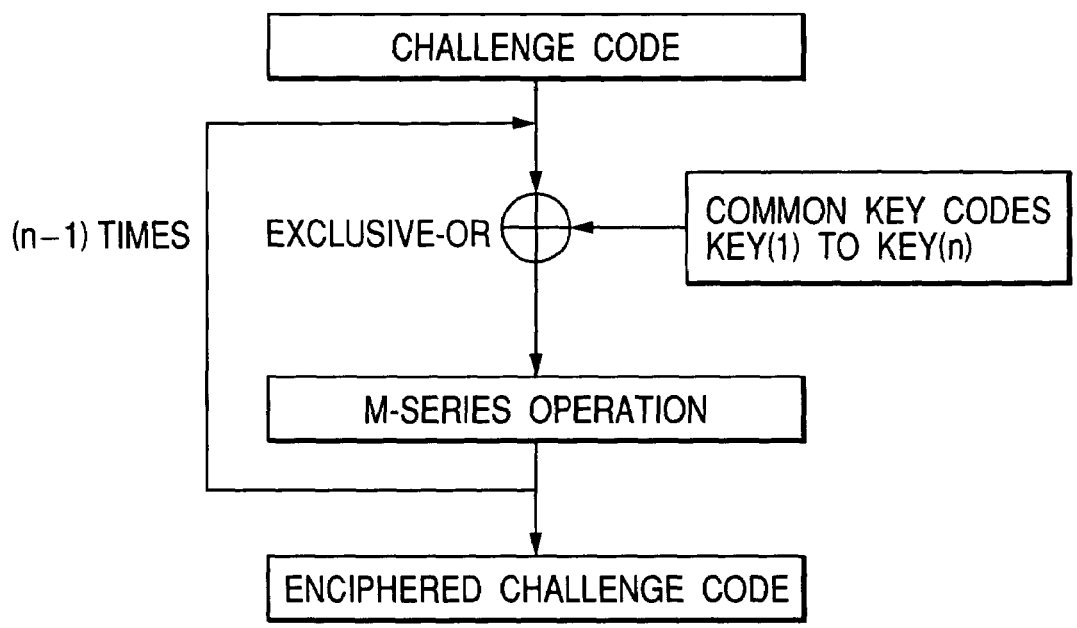
FIG. 12 is an illustration of an enciphering algorithm according to the second embodiment.

In addition, the RAM stores an enciphering table (se FIG. 11) to be used for enciphering the challenge code and an enciphering algorithm (see FIG. 12) in the form of a program. Accordingly, when the portable unit 30 enters the detection area 31, the portable unit 30 immediately receives a challenge code and enciphers the received challenge code and then transmits a transmission code signal with the ID code.

In the table, n common key codes [KEY(1) to KEY(n)] each comprising a different group of m bits are set as shown in FIG. 11. Of these, a key code peculiar to the vehicle and stored in the RAM is set as the k-th common key code.

The transmission code signal transmitted from the portable unit 30 is received by a wireless receiver 34 mounted on the vehicle 32. The received transmission code signal is sent to the security ECU 35, and the security ECU 35 restores the enciphered challenge code.

The security ECU 35 has a RAM (not shown) and this RAM stores a deciphering table (which is the same as the table shown in FIG. 11) to be used for restoring the enciphered challenge code and further stores a deciphering algorithm, which is for restoring the enciphered challenge code, in the form of a program. Moreover, this RAM stores the key code specific to the vehicle and the registration key code.

The security ECU 35 extracts the ID code and the enciphered challenge code and stores the enciphered challenge code, and further makes a decision as to whether or not the ID code stored in the RAM agrees with the extracted ID code. Moreover, the security ECU 35 makes a decision as to whether or not the challenge code transmitted from the vehicle transmitter 33 and is to be stored in the RAM agrees with the restored challenge code.

If the decisions indicate the agreement of the both the ID code and challenge code, a door locking mechanism 36 or a baggage door locking mechanism 39 is set to an unlocking stand-by condition. Moreover, when the use of a door handle is detected by a touch switch (not shown) mounted on the door handle, the door or the baggage door is placed into the unlocked condition.

Thus, in this embodiment, a decision is made as to whether or not the restored challenge code satisfies a predetermined relationship.

On the other hand, when the wearer of the portable unit 30 opens and closes a door and gets in the vehicle, the two-way communications are made with respect to the portable unit 30 through the use of the vehicle side transmitter 33 and the wireless receiver 34 placed in the interior of the vehicle to again make the collation of the ID code and the challenge code. At this time, if the ID code collation result and the challenge code collation result show the agreement, the steering locking mechanism 37 is placed into the unlocking stand-by condition. In this condition, in response to the operation of an engine stop (not shown) previously mounted in the vehicle 32, the steering locking mechanism 37 is placed into the unlocked condition and an instruction signal is outputted to an engine ECU 38 for canceling the engine start inhibition.

Thus, the wearer of the portable unit 30 can get in the vehicle in the door-unlocked state and start the engine without holding the portable unit 30.

In addition, when the wearer of the portable unit 30 gets out the vehicle 32 and operates the door locking switch mounted on the door handle after the vehicle 32 stops and the engine switch is turned off, each of the doors of the vehicle 32 is locked and, at the same time, the engine is placed into the start inhibiting condition by means of the engine ECU 38.

As described above, in the electronic key system according to this embodiment, the security setting/cancellation of the vehicle 32, including the door locking/unlocking, can automatically be done by wearing only the portable unit (Normal Operation)

Secondly, referring to flow charts of FIGS. 13 and 14, a description will be given hereinbelow of an operation to be conducted in remotely operating the door locking mechanism 36 or the baggage locking mechanism 39 through the use of the two-way connections between the portable unit 30 having the above-mentioned configuration and the vehicle 32.

Figure 13:
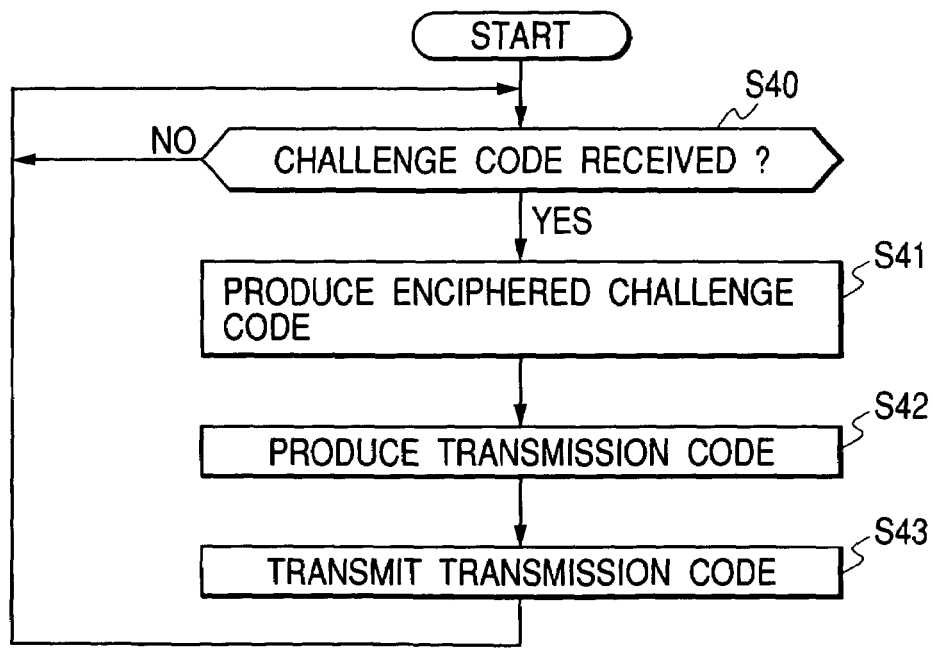
FIG. 13 is a flow chart showing processing in a normal operation in a portable unit according to the second embodiment.

In FIG. 13, in a step S40, in the portable unit 30, a decision is made on the reception of a challenge code signal transmitted at a predetermined interval from the vehicle side transmitter 33. In the case of the reception of the challenge code signal, the operational flow advances to a step S41. On the other hand, in the case of no reception thereof, the operation falls into a waiting condition until the reception of a challenge code signal.

In the step S41, the received challenge code signal is enciphered to produce an enciphered challenge code. This enciphered challenge code producing method will be described with reference to at able shown in FIG. 11 and an enciphering algorithm shown in FIG. 12.

First, the exclusive-OR logic operation is conducted between the first common key code [KEY(1)] shown in FIG. 11 and the received challenge code. Then, a well-known M-series operation is conducted with respect to the exclusive-OR logic operation result. Thereafter, the exclusive-OR logic operation and the M-series operation using the second and subsequent common key codes are conducted (n–1) times, thereby enciphering the challenge code and finally producing an enciphered challenge code.

In the k-th executive-OR logic operations, a key code specific to the vehicle is used as the k-th common key code [KEY(k)] in the table. Accordingly, the k-th exclusive-OR logic operation method varies according to vehicle, and the enciphering method varies according to vehicle.

In a step S42, a transmission code is produced using the enciphered challenge code produced in the step S41 and an ID code stored in the RAM. For example, this transmission code is produced by adding format bits (start bit, stop bit, parity bit) to each of the enciphered challenge code and the ID code and further adding a random number comprising a predetermined number of bits thereto.

In a step S43, a signal of the transmission code produced in the step S42 (transmission code signal) is transmitted.

Figure 14:
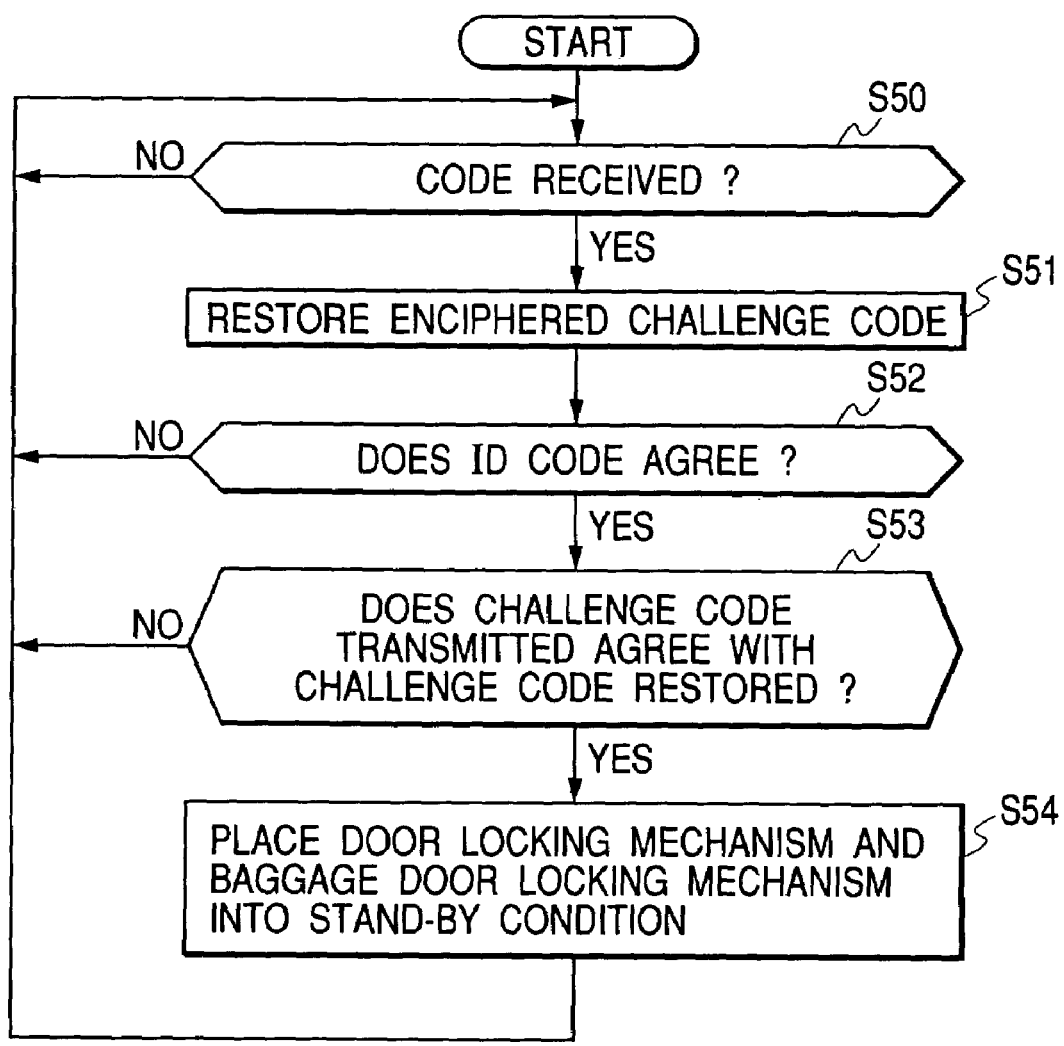
FIG. 14 is a flow chart showing processing in a normal operation in a vehicle side according to the second embodiment.

In addition, in FIG. 14, in a step S50, a decision is made on the reception of the transmission code signal from the portable unit 30. In the case of the reception of the transmission code signal, the operational flow advances to a step S51. Otherwise, the operation falls into a waiting condition until the reception of a transmission code signal.

In the step S51, the ID code and the enciphered challenge code are extracted from the received transmission code, and the extracted enciphered challenge code is restored. A deciphering algorithm is used for the restoration of the enciphered challenge code. Following this, in a step S52, a decision is made as to whether or not the extracted ID code agrees with the ID code stored in the RAM of the security ECU 35. In the case of the ID code agreement, the operational flow goes to a step S53. In the case of the disagreement, the operational flow returns to the step S50 so that the operation again falls into a waiting condition until the reception of a transmission code signal.

In the step S53, a decision is made as to whether or not the challenge code restored in the step S51 agrees with the challenge code transmitted from the vehicle side transmitter 33 and stored in the RAM. In the case of the agreement between the challenge codes, the operational flow goes to a step S54. On the other hand, in the case of the disagreement therebetween, the operational flow returns to the step S50 so that the operation again falls into a waiting condition until the reception of a transmission code signal.

In the step S54, the door locking mechanism 36 and the baggage door locking mechanism 39 are placed into an unlocking stand-by condition. In addition, although not shown, the starting of the handle operation is detected, the doors and the baggage door are placed into an unlocked condition. The operation to be conducted until the wearer of the portable unit 30 gets in the vehicle 32 and issues an instruction signal for canceling the engine starting inhibition is similar to that described with reference to FIGS. 13 and 14, and the description thereof will be omitted for simplicity.

(Key Code Registration)

Figure 17:
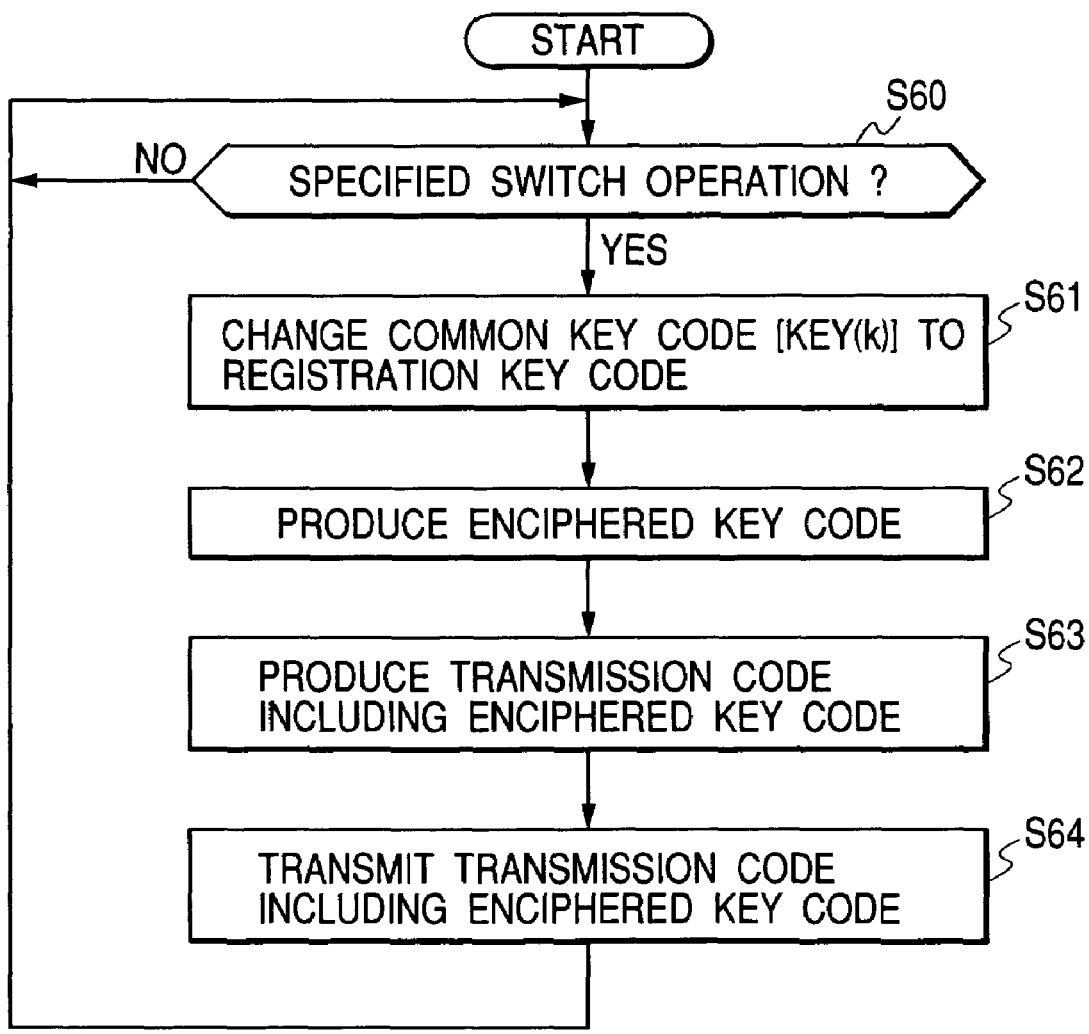
FIG. 17 is a flow chart showing processing in a portable unit at the key code registration according to the second embodiment.
Figure 18:
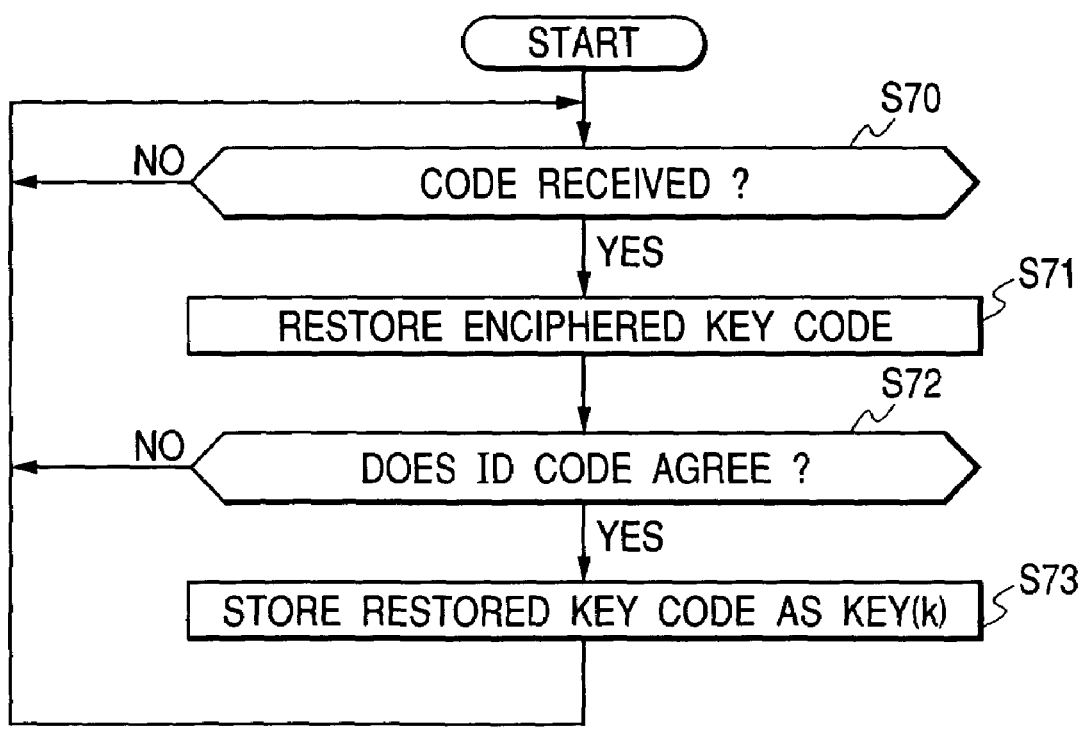
FIG. 18 is a flow chart showing processing in a vehicle at the key code registration according to the second embodiment.

Furthermore, referring to flow charts of FIGS. 17 and 18, a description will be given hereinbelow of operations to be conducted when a specific key code of the portable unit 30 peculiar to a vehicle is registered in the security ECU 35 of the vehicle 32, which organizes a feature of this embodiment.

In this case, prior to transmitting a transmission code signal from the portable unit 30, the security ECU 35 is previously switched to a key code registration mode. Moreover, at this time, the k-th common key code [KEY(k)] in a key code deciphering table (which is the same as that shown in FIG. 11), stored in the RAM of the security ECU 35, is changed to a registration key code. As mentioned above, this registration key code is a variable comprising m bits, for example, 0000 or ffff.

For this mode switching, for example, a mode switching signal is transmitted from a registration-dedicated portable unit or the like, separately prepared, and the wireless receiver 34 receives this mode switching signal and changes the mode of the security ECU 35. When the mode switching has been done, the security ECU 35 is made so as not to output a challenge code.

First, in a step S60, a decision is made as to whether or not a specified operation is conducted through the use of a push button (not shown) of the portable unit 30. In the case of the specified operation being conducted, the operational flow advances to a step S61. Otherwise, the operation falls into a waiting condition until the specified operation is conducted. Since in the portable unit 30 the key code peculiar to the vehicle is enciphered and transmitted when the specified operation is conducted through the use of the switch, the transmission of the key code is easily feasible.

This "specified switch operation" signifies that a plurality of specified switches are pressed simultaneously or a plurality of switches are pressed in a specified sequence.

Figure 15:
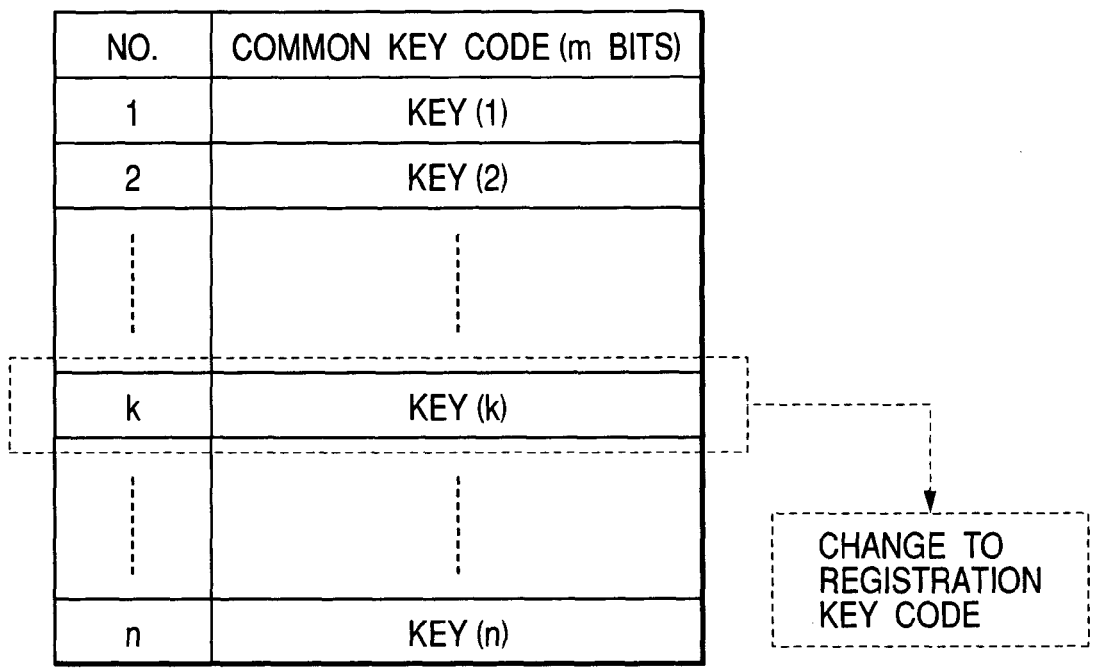
FIG. 15 is an illustration of an enciphering table to be used for enciphering a key code at key code registration in the second embodiment.
Figure 16:
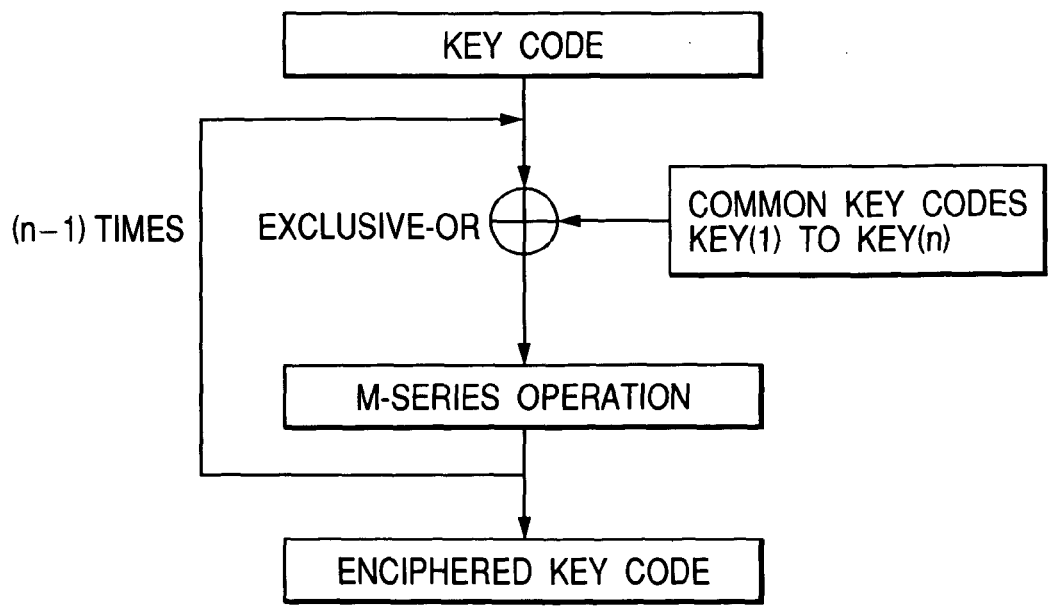
FIG. 16 is an illustration of an enciphering algorithm for enciphering a key code in the second embodiment.

In the step S61, in an enciphering table stored in the RAM of the portable unit 30 and made for enciphering the key code, the k-th common key code [KEY(k)] is changed to a registration key code to be stored in the same RAM as shown in FIG. 15. This registration key code is a variable comprising m bits, for example, 0000 or ffff.

In a step S62, the key code peculiar to the vehicle and stored in the RAM is enciphered to produce an enciphered key code. This enciphered key code producing method is the same as the above-mentioned method of enciphering a challenge code for the production of the enciphered challenge code, except that the registration key code is used as the k-th common key code in the table shown in FIG. 15 and the object to be enciphered through the use of the enciphering algorithm is only the key code specific to the vehicle.

Therefore, the description of the enciphered key code producing method will be omitted for brevity.

Thus, since the enciphering of the key code in this embodiment is made through the use of an enciphering algorithm to be used in enciphering a challenge code signal transmitted from the portable unit 30, there is no need to prepare a dedicated enciphering algorithm, which leads to saving the software capacity and reducing the management manhour.

In a step S63, a transmission code is produced using the enciphered key code produced in the step S62 and the ID code stored in the RAM. As mentioned above, for example, this transmission code is produced by adding format bits (start bit, stop bit, parity bit) to each of the codes and further adding a random number comprising a predetermined number of bits thereto.

Furthermore, referring to the flow chart of FIG. 18, a description will be given hereinbelow of an operation to be implemented from when the wireless receiver 34 receives the above-mentioned transmission code including the enciphered key code until the restored key code is stored.

First, in a step S70, a decision is made as to whether or not the wireless receiver 34 receives the transmission code from the portable unit 30. In the case of the reception of the transmission code, the operational flow advances to a step S71. otherwise, the operation falls into a waiting condition until the reception thereof.

In the step S71, the ID code and the enciphered key code are extracted from the transmission code to restore the extracted key code. The restoration of the enciphered key code is made using a table setting a registration key code. Following this, in a step S72, a decision is made as to whether or not the extracted ID code agrees with the ID code stored in the RAM of the security ECU 35. In the case of the agreement between the ID codes, the operational flow goes to a step S73. On the other hand, if not, the operational flow return to S70 so that the operation again falls into a waiting condition for the transmission code.

In the step S73, the key code restored from the transmission code is stored in the RAM of the security ECU 35. Alternatively, in a case in which the key code is already stored therein, the key code already stored is overwritten with the restored key code.

Thus, since the remote control system is applied to an electronic key system for controlling each door locking mechanism or steering locking mechanism of a vehicle or for controlling the vehicle engine into a start allowing/inhibiting condition, the specific key code is placed into an acquisition difficulty condition, which can prevent the unauthorized copying of the portable unit.

Incidentally, according to this present invention, the enciphering algorithm and the deciphering algorithm described in this embodiment are not limited to the above-mentioned enciphering method based on the exclusive-OR logic operation and M-series operation.

In addition, it is also appropriate to, in the normal operation and the key code registration processing, encipher an ID code included in the transmission code transmitted form the portable unit 30. Still additionally, it is also appropriate that a transmission code including an enciphered ID code is transmitted from the portable unit 30 so that the security ECU 35 of the vehicle 32 receives the transmission code to carry out the restoration of the enciphered ID code.

It should be understood that the present invention is not limited to the above-described embodiments, and that it is intended to cover all changes and modifications of the embodiments of the invention herein which do not constitute departures from the spirit and scope of the invention.

What is claimed is:

1. A remote control system comprising:
a transmitter including enciphering means for enciphering a predetermined code through the use of a specific key code peculiar to each system, said transmitter transmitting the enciphered code produced by said enciphering means; and
a receiver including deciphering means for receiving the enciphered code to decipher the enciphered code through the use of said specific key code, said receiver outputting an instruction for activating a controlled object when the deciphered code from said deciphering means satisfies a predetermined relationship,
said transmitter and said receiver being configured so that, when said specific key code to be used in said deciphering means is transmitted from said transmitter to said receiver and registered therein, said enciphering means enciphers said specific key code through the use of a default key code stored in said transmitter and said receiver, and said transmitter transmits the enciphered specific key code to said receiver.

2. The system according to claim 1, wherein said transmitter transmits the enciphered specific key code to said receiver when a predetermined operation is conducted.

3. A remote control system comprising:
a portable unit including enciphering means for enciphering a predetermined code through the use of a specific key code peculiar to each system, said portable unit transmitting the enciphered code produced by said enciphering means, and a vehicle-mounted control unit including deciphering means for transmitting said predetermined code to said portable unit and receiving said enciphered code returned from said portable unit in response to the transmission of said predetermined code to decipher the enciphered code through the use of said specific key code, said vehicle-mounted control unit outputting an instruction for activating a controlled object when the deciphered code produced by said deciphering means satisfies a predetermined relationship with respect to the transmitted predetermined code, said portable unit and said vehicle-mounted control unit being configured so that, when said specific key code to be used in said deciphering means is transmitted from said portable unit to said vehicle-mounted control unit and registered therein, said enciphering means enciphers said specific key code through the use of a default key code stored in said portable unit and said vehicle-mounted control unit, and said portable unit transmits the enciphered specific key code to said vehicle-mounted control unit.

4. The system according to claim 3, wherein said portable unit transmits the enciphered specific key code to said vehicle-mounted control unit when a predetermined operation is conducted.

5. A remote control system comprising:
a transmitter including enciphering means having an enciphering table with a plurality of common key codes to be used for enciphering a specific key code specific to a particular remote control system,
said enciphering means changing one of said plurality of common key codes to a registration key code set in advance to change the contents of said enciphering table and enciphering said specific key code through the use of the changed enciphering table including said registration key code, and
said transmitter transmitting the enciphered specific key code produced by said enciphering means; and
a receiver for outputting an instruction for activating a controlled object, said receiver including deciphering means for receiving the enciphered specific key code to decipher the enciphered specific key code through the use of said registration key code stored in advance, said receiver registering the deciphered specific key code therein.

6. The system according to claim 5, wherein, when a predetermined operation is conducted with respect to said transmitter, said transmitter transmits the enciphered specific key code.

7. The system according to claim 5, wherein said enciphering means enciphers a predetermined code including said specific key code, said transmitter transmits the enciphered predetermined code to said receiver, said deciphering means deciphers the enciphered predetermined code, and said receiver makes a decision as to whether or not the deciphered predetermined code is in a predetermined range with respect to a code stored in advance and, if the deciphered predetermined code is in said predetermined range, outputs said instruction for activating said controlled object.

8. The system according to claim 5, wherein the one of said plurality of common key codes is changed to said registration key code by said enciphering means for enciphering said specific key code.

9. A remote control system for a vehicle, comprising:
a portable unit including enciphering means having an enciphering table with a plurality of common key codes to be used for enciphering a specific key code specific to a particular remote control system,
said enciphering means changing one of said plurality of common key codes to a registration key code set in advance to change the contents of said enciphering table and enciphering said specific key code through the use of the changed enciphering table including said registration key code, and
said portable unit transmitting the enciphered specific key code produced by said enciphering means; and
a vehicle-mounted control unit for outputting an instruction for activating a controlled object, said vehicle-mounted control unit including deciphering means for receiving said enciphered specific key code to decipher the enciphered specific key code through the use of said registration key code, said vehicle-mounted unit registering the deciphered specific key code therein.

10. The system according to claim 9, wherein, when a predetermined operation is conducted with respect to said portable unit, said portable unit transmits an enciphered predetermined code.

11. The system according to claim 9, wherein said enciphering means enciphers a predetermined code including said specific key code, said portable control unit transmits the enciphered predetermined code to said vehicle-mounted unit, said deciphering means deciphers the enciphered predetermined code, and said vehicle-mounted control unit makes a decision as to whether or not the deciphered predetermined code is in a predetermined range with respect to said predetermined code transmitted therefrom and, if the deciphered predetermined code is in said predetermined range, outputs said instruction for activating said controlled object.

12. The system according to claim 9, wherein the one of said plurality of common key codes is changed to said registration key code by said enciphering means for enciphering said specific key code.

* * * * *